(12) United States Patent
Ketchum et al.

(10) Patent No.: US 8,199,842 B2
(45) Date of Patent: Jun. 12, 2012

(54) TIME-DOMAIN TRANSMIT AND RECEIVE PROCESSING WITH CHANNEL EIGEN-MODE DECOMPOSITION FOR MIMO SYSTEMS

(75) Inventors: John W. Ketchum, Harvard, MA (US); Mark Wallace, Bedford, MA (US); Steven J. Howard, Ashland, MA (US); Jay Rod Walton, Westford, MA (US)

(73) Assignee: Qualcomm Incorporated, San Diego, CA (US)

( * ) Notice: Subject to any disclaimer, the term of this patent is extended or adjusted under 35 U.S.C. 154(b) by 217 days.

(21) Appl. No.: 12/193,628

(22) Filed: Aug. 18, 2008

(65) Prior Publication Data

US 2008/0317158 A1    Dec. 25, 2008

Related U.S. Application Data

(63) Continuation of application No. 11/500,852, filed on Aug. 7, 2006, now Pat. No. 7,430,245, which is a continuation of application No. 10/884,305, filed on Jul. 2, 2004, now Pat. No. 7,116,725, which is a continuation of application No. 10/017,308, filed on Dec. 7, 2001, now Pat. No. 6,760,388.

(51) Int. Cl.
*H04B 7/02* (2006.01)
*H04L 1/02* (2006.01)

(52) U.S. Cl. .................................................. 375/267
(58) Field of Classification Search .................. 375/267, 375/299
See application file for complete search history.

(56) References Cited

U.S. PATENT DOCUMENTS

| 6,219,561 B1 | 4/2001 | Raleigh |
| 6,473,467 B1 | 10/2002 | Wallace et al. |
| 6,665,545 B1 | 12/2003 | Raleigh et al. |

(Continued)

FOREIGN PATENT DOCUMENTS

CN    1304218    7/2001

(Continued)

OTHER PUBLICATIONS

"Singular value decomposition", From Wikipedia, the free encyclopedia, http://en.wikipedia.org/wiki/Singular_value_decomposition.*

(Continued)

*Primary Examiner* — Shuwang Liu
*Assistant Examiner* — Nader Bolourchi
(74) *Attorney, Agent, or Firm* — Qualcomm Patent Group; James H. Yancey, Jr.

(57) ABSTRACT

Techniques for processing a data transmission at the transmitter and receiver. In an aspect, a time-domain implementation is provided which uses frequency-domain singular value decomposition and "water-pouring" results to derive time-domain pulse-shaping and beam-steering solutions at the transmitter and receiver. The singular value decomposition is performed at the transmitter to determine eigen-modes (i.e., spatial subchannels) of the MIMO channel and to derive a first set of steering vectors used to "precondition" modulation symbols. The singular value decomposition is also performed at the receiver to derive a second set of steering vectors used to precondition the received signals such that orthogonal symbol streams are recovered at the receiver, which can simplify the receiver processing. Water-pouring analysis is used to more optimally allocate the total available transmit power to the eigen-modes, which then determines the data rate and the coding and modulation scheme to be used for each eigen-mode.

4 Claims, 5 Drawing Sheets

U.S. PATENT DOCUMENTS

| | | | |
|---|---|---|---|
| 6,718,184 | B1 | 4/2004 | Aiken et al. |
| 6,760,388 | B2 | 7/2004 | Ketchum et al. |
| 6,870,882 | B1 * | 3/2005 | Al-Dhahir et al. ............ 375/233 |
| 6,888,899 | B2 | 5/2005 | Raleigh et al. |
| 6,956,907 | B2 | 10/2005 | Ketchum |
| 6,975,666 | B2 | 12/2005 | Affes et al. |
| 7,190,734 | B2 | 3/2007 | Giannakis et al. |
| 2001/0033622 | A1 * | 10/2001 | Jongren et al. ................ 375/267 |
| 2002/0051433 | A1 * | 5/2002 | Affes et al. ................... 370/335 |
| 2003/0073464 | A1 * | 4/2003 | Giannakis et al. ............ 455/562 |

FOREIGN PATENT DOCUMENTS

| | | |
|---|---|---|
| WO | WO9809381 | 3/1998 |

OTHER PUBLICATIONS

"Eigenvalue, eigenvector and eigenspace", From Wikipedia, the free encyclopedia, http://en.wikipedia.org/wiki/Eigenvectors.*

Joonsuk Kim et al. "Spatial Multiuser Access with Antenna Diversity using Singular Value Decomposition," ICC 2000, 2000 IEEE International Conference on Communications. Conference Record, New Orleans LA, Jun. 18-21 2000, IEEE International Conference on Communications, New York, NY: IEEE, US, vol. 1 of 3, Jun. 18, 2000, pp. 1253-1257.

Joonsuk Kim et al., "Transmission Optimization With a Space-Time Filter At Low SNR Wireless Environment" Global Telecommunications Conference, Globecom '99, Rio De Janeiro, Brazil, vol. 1B, Dec 5-9, 1999, pp. 889-893.

Sampath H., et al., "Joint transmit and receive optimization for high data rate wireless communication using multiple antennas, XP010373976," 2002, 215-219.

Burr A G, "Adaptive space-time signal processing and coding," vol. 2, pp. 710-714, MILCOM 2000. 21st Century Military Communications Conference Proceedings Oct. 22-25, 2000, 20001022; 20001022-20001025 Piscataway, NJ, USA,IEEE—ISBN 978-0-7803-6521-6 ; ISBN 0-7803-6521-6; XP010531996.

International Search Report—PCT/US2002/038671, International Search Authority—European Patent Office—Jun. 5, 2003.

* cited by examiner

TIME-DOMAIN TRANSMIT AND RECEIVE PROCESSING WITH CHANNEL EIGEN-MODE DECOMPOSITION FOR MIMO SYSTEMS

CLAIM OF PRIORITY

This application is a continuation of, and claims the benefit of priority from, U.S. patent application Ser. No. 11/500,852 filed on Aug. 7, 2006 and entitled "Time-Domain Transmit and Receive Processing with Channel EIGEN-Mode Decomposition for MIMO Systems," now U.S. Pat. No.7,430,245 issued on Sep. 30, 2008, which is a continuation of U.S. patent application Ser. No. 10/884,305 filed Jul. 2, 2004, now U.S. Pat. No. 7,116,725 issued on Oct. 3, 2006 and entitled "Time-Domain Transmit and Receive Processing with Channel EIGEN-Mode Decomposition for MIMO Systems," which is a continuation of U.S. patent application Ser. No. 10/017,308, filed on Dec. 7, 2001, now U.S. Pat. No. 6,760,388, issued on Jul. 6, 2004 and entitled "Time-Domain Transmit and Receive Processing with Channel EIGEN-Mode Decomposition for MIMO Systems," all of which are assigned to the assignee of this application and are fully incorporated herein by reference for all purposes.

BACKGROUND

1. Field

The present invention relates generally to data communication, and more specifically to techniques for time-domain transmit and receive processing with channel eigen-mode decomposition for multiple-input multiple-output (MIMO) communication systems.

2. Background

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. If the propagation paths between the transmit and receive antennas are linearly independent (i.e., a transmission on one path is not formed as a linear combination of the transmissions on other paths), which is generally true to at least an extent, then the likelihood of correctly receiving a data transmission increases as the number of antennas increases. Generally, diversity increases and performance improves as the number of transmit and receive antennas increases.

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, with $N_C \leq \min\{N_T, N_R\}$. Each of the $N_C$ independent channels is also referred to as a spatial subchannel of the MIMO channel and corresponds to a dimension. The MIMO system can provide improved performance (e.g., increased transmission capacity) if the additional dimensionalities created by the multiple transmit and receive antennas are utilized.

The spatial subchannels of a wideband MIMO system may experience different channel conditions (e.g., different fading and multipath effects) across its bandwidth and may achieve different signal-to-noise-and-interference ratios (SNRs) at different frequencies (i.e., different frequency bins or subbands) of the overall system bandwidth. Consequently, the number of information bits per modulation symbol (i.e., the data rate) that may be transmitted at different frequency bins of each spatial subchannel for a particular level of performance may be different from bin to bin. Moreover, the channel conditions typically vary with time. As a result, the supported data rates for the bins of the spatial subchannels also vary with time.

To combat the frequency selective nature of the wideband channel (i.e., different channel gains for different bins), orthogonal frequency division multiplexing (OFDM) may be used to effectively partition the system bandwidth into a number of ($N_F$) subbands (which may be referred to as frequency bins or subchannels). In OFDM, each frequency subchannel is associated with a respective subcarrier upon which data may be modulated, and thus may also be viewed as an independent transmission channel.

A key challenge in a coded communication system is the selection of the appropriate data rates and coding and modulation schemes to be used for a data transmission based on channel conditions. The goal of this selection process is to maximize throughput while meeting quality objectives, which may be quantified by a particular frame error rate (FER), certain latency criteria, and so on.

One straightforward technique for selecting data rates and coding and modulation schemes is to "bit load" each frequency bin of each spatial subchannel according to its transmission capability, which may be quantified by the bin's short-term average SNR. However, this technique has several major drawbacks. First, coding and modulating individually for each bin of each spatial subchannel can significantly increase the complexity of the processing at both the transmitter and receiver. Second, coding individually for each bin may greatly increase coding and decoding delay. And third, a high feedback rate may be needed to send channel state information (CSI) indicative of the channel conditions (e.g., the gain, phase and SNR) of each bin.

There is therefore a need in the art for achieving high throughput in a coded MIMO system without having to individually code different frequency bins of the spatial subchannels.

SUMMARY

Aspects of the invention provide techniques for processing a data transmission at the transmitter and receiver of a MIMO system such that high performance (i.e., high throughput) is achieved without the need to individually code/modulate for different frequency bins. In an aspect, a time-domain implementation is provided herein which uses frequency-domain singular value decomposition and "water-pouring" results to derive pulse-shaping and beam-steering solutions at the transmitter and receiver. The singular value decomposition is performed at the transmitter to determine the eigen-modes (i.e., the spatial subchannels) of the MIMO channel and to derive a first set of steering vectors that are used to "precondition" modulation symbols. The singular value decomposition is also performed at the receiver to derive a second set of steering vectors that are used to precondition the received signals such that orthogonal symbol streams are recovered at the receiver, which can simplify the receiver processing. Water-pouring analysis is used to more optimally allocate the total available transmit power for the MIMO system to the eigen-modes of the MIMO channel. The allocated transmit power may then determine the data rate and the coding and modulation scheme to be used for each eigen-mode.

At the transmitter, data is initially coded in accordance with one or more coding schemes to provide coded data, which is then modulated in accordance with one or more modulation schemes to provide a number of modulation symbol streams (e.g., one stream for each eigen-mode). An estimated channel response matrix for the MIMO channel is determined (e.g., at the receiver and sent to the transmitter) and decomposed (e.g., in the frequency domain, using singular value decomposition) to obtain a first sequence of matrices of (right) eigen-vectors and a second sequence of matrices of singular values. Water-pouring analysis may be performed based on the matrices of singular values to derive a third sequence of matrices of values indicative of the transmit power allocated to the eigen-modes of the MIMO channel. A pulse-shaping matrix for the transmitter is then derived based on the first and third sequences of matrices. The pulse-shaping matrix comprises the steering vectors that are used to precondition the modulation symbol streams to obtain a number of preconditioned signals, which are then transmitted over the MIMO channel to the receiver.

At the receiver, the estimated channel response matrix is also determined and decomposed to obtain a fourth sequence of matrices of (left) eigen-vectors, which are then used to derive a pulse-shaping matrix for the receiver. A number of signals is received at the receiver and preconditioned based on this pulse-shaping matrix to obtain a number of received symbol streams. Each received symbol stream may be equalized to obtain a corresponding recovered symbol stream, which is then demodulated and decoded to recover the transmitted data.

Various aspects and embodiments of the invention are described in further detail below. The invention further provides methods, digital signal processors, transmitter and receiver units, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The techniques described herein for processing a data transmission at the transmitter and receiver may be used for various wireless communication systems. For clarity, various aspects and embodiments of the invention are described specifically for a multiple-input multiple-output (MIMO) communication system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, with $N_C \leq \min\{N_T, N_R\}$. Each of the $N_C$ independent channels is also referred to as a spatial subchannel (or a transmission channel) of the MIMO channel. The number of spatial subchannels is determined by the number of eigen-modes for the MIMO channel, which in turn is dependent on a channel response matrix that describes the response between the $N_T$ transmit and $N_R$ receive antennas.

Figure 1:
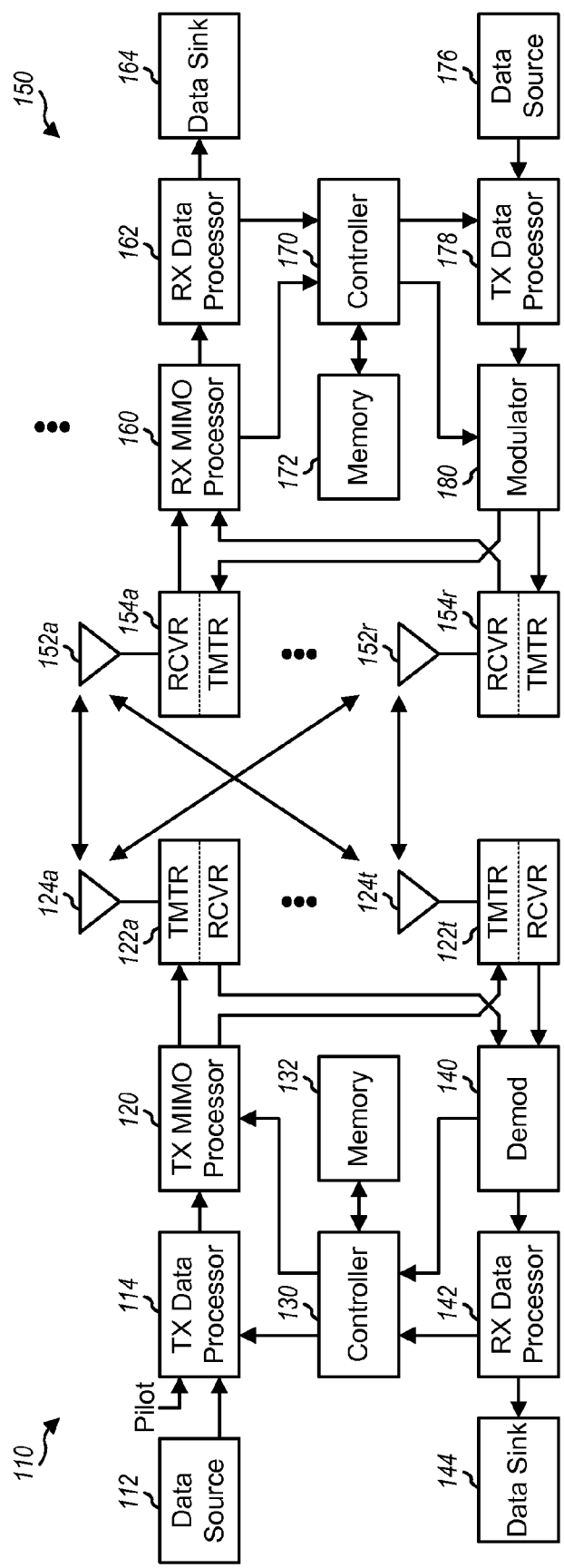
FIG. 1 is a block diagram of an embodiment of a transmitter system and a receiver system of a MIMO system.

FIG. 1 is a block diagram of an embodiment of a transmitter system 110 and a receiver system 150, which are capable of implementing various aspects and embodiments of the invention.

At transmitter system 110, traffic data is provided from a data source 112 to a transmit (TX) data processor 114, which formats, codes, and interleaves the traffic data based on one or more coding schemes to provide coded data. The coded traffic data may then be multiplexed with pilot data using, e.g., time division multiplex (TDM) or code division multiplex (CDM) in all or a subset of the data streams to be transmitted. The pilot data is typically a known data pattern processed in a known manner, if at all. The multiplexed pilot and coded traffic data is then modulated (i.e., symbol mapped) based on one or more modulation schemes to provide modulation symbols, one modulation symbol stream for each spatial subchannel to be used for data transmission. The data rate, coding, interleaving, and modulation for each spatial subchannel may be determined by controls provided by a controller 130.

The modulation symbols are then provided to a TX MIMO processor 120 and further processed. In a specific embodiment, the processing by TX MIMO processor 120 includes (1) determining an estimated channel frequency response matrix for the MIMO channel, (2) decomposing the estimated channel frequency response matrix to determine the eigen-modes of the MIMO channel and to derive a set of "steering" vectors for the transmitter, one vector for the modulation symbol stream to be transmitted on each spatial subchannel, (3) deriving a transmit spatio-temporal pulse-shaping matrix based on the steering vectors and a diagonal matrix indicative of the energies (i.e., the transmit powers) assigned to the eigen-modes, and (4) preconditioning (e.g., convolving) the modulation symbols with the pulse-shaping matrix to derive preconditioned modulation symbols. The processing by TX MIMO processor 120 is described in further detail below. Up to $N_T$ streams of preconditioned modulation symbols are then provided to transmitters (TMTR) 122a through 122t.

Each transmitter 122 converts the received preconditioned modulation symbol stream into one or more analog signals and further conditions (e.g., amplifies, filters, and quadrature modulates) the analog signals to generate a modulated signal suitable for transmission over the MIMO channel. The modulated signal from each transmitter 122 is then transmitted via a respective antenna 124 to the receiver system.

At receiver system 150, the transmitted modulated signals are received by $N_R$ antennas 152a through 152r, and the received signal from each antenna 152 is provided to a respective receiver (RCVR) 154. Each receiver 154 conditions (e.g., filters, amplifies, and downconverts) the received signal and digitizes the conditioned signal to provide a respective stream of samples. A RX MIMO processor 160 then receives and processes the $N_R$ sample streams to provide $N_T$ streams of recovered modulation symbols. In an embodiment, the processing by RX MIMO processor 160 may include (1) determining an estimated channel frequency response matrix for the MIMO channel, (2) decomposing the estimated channel frequency response matrix to derive a set of steering vectors for the receiver, (3) deriving a receive spatio-temporal pulse-shaping matrix based on the steering vectors, (4) preconditioning (e.g., convolving) the samples with the pulse-shaping matrix to derive received modulation symbols, and (5) equalizing the received modulation symbols to derive the recovered modulation symbols. The processing by RX MIMO processor 160 is described in further detail below.

A receive (RX) data processor 162 then demodulates, deinterleaves, and decodes the recovered modulation symbols to recover the transmitted traffic data. The processing by RX MIMO processor 160 and RX data processor 162 is complementary to that performed by TX MIMO processor 120 and TX data processor 114, respectively, at transmitter system 110.

RX MIMO processor 160 may further derive channel impulse responses for the MIMO channel, the signal-to-noise-and-interference ratios (SNRs) for the spatial subchannels, and so on, and provide these to a controller 170. RX data processor 162 may also provide the status of each received packet or frame, one or more other performance metrics indicative of the decoded results, and possible other information. Controller 170 then derives channel state information (CSI), which may comprise all or some of the information received from RX MIMO processor 160 and RX data processor 162. The CSI is processed by a TX data processor 178, modulated by a modulator 180, conditioned by transmitters 154a through 154r, and transmitted back to transmitter system 110.

At transmitter system 110, the modulated signals from receiver system 150 are received by antennas 124, conditioned by receivers 122, and demodulated by a demodulator 140 to recover the CSI transmitted by the receiver system. The CSI is then provided to controller 130 and used to generate various controls for TX data processor 114 and TX MIMO processor 120.

Controllers 130 and 170 direct the operation at the transmitter and receiver systems, respectively. Memories 132 and 172 provide storage for program codes and data used by controllers 130 and 170, respectively. In a MIMO system with limited total transmit power and operating over a frequency-selective channel (i.e., different gains at different frequencies), the channel capacity, C, is given by:

$$C = \max_{\underline{\Phi}_{xx}(k)} \sum_{k=1}^{N_F} \log|I + \underline{\Phi}_{zz}^{-1}(k)\underline{H}(k)\underline{\Phi}_{xx}(k)\underline{H}^H(k)|, \quad \text{Eq (1)}$$

subject to $$\sum_{k=1}^{N_F} \text{trace}[\underline{\Phi}_{xx}(k)] = E_T,$$

where $E_T$ is the total available transmit power for the MIMO system;

$\underline{\Phi}_{zz}(k)$ is an $N_R \times N_R$ power spectral density matrix of an $N_R \times 1$ noise process vector, $\underline{z}(n)$, at the receiver at frequency $f_k$;

$\underline{H}(k)$ is an $N_R \times N_T$ channel frequency response matrix at frequency $f_k$; and $\underline{\Phi}_{xx}(k)$ is an $N_T \times N_T$ power spectral density matrix of an $N_T \times 1$ transmitted signal vector, $\underline{x}(n)$, at frequency $f_k$.

The singular value decomposition (SVD) of the channel frequency response matrix $\underline{H}(k)$ at frequency $f_k$ may be expressed as:

$$\underline{H}(k) = \underline{U}(k)\underline{\lambda}(k)\underline{V}^H(k), \quad \text{Eq (2)}$$

where $\underline{U}(k)$ is an $N_R \times N_R$ unitary matrix (i.e., $U^H U = I$, where I is the identity matrix with ones along the diagonal and zeros everywhere else);

$\underline{\lambda}(k)$ is an $N_R \times N_T$ diagonal matrix of singular values of $\underline{H}(k)$; and $\underline{V}(k)$ is an $N_T \times N_T$ unitary matrix.

The diagonal matrix $\underline{\lambda}(k)$ contains non-negative real values along the diagonal (i.e., $\underline{\lambda}(k) = \text{diag}(\lambda_1(k), \lambda_2(k), \ldots \lambda_{N_T}(k))$) and zeros elsewhere. The $\lambda_i(k)$ are referred to as the singular values of the matrix $\underline{H}(k)$. The singular value decomposition is a matrix operation known in the art and described in various references. One such reference is a book by Gilbert Strang entitled "Linear Algebra and Its Applications," Second Edition, Academic Press, 1980, which is incorporated herein by reference.

It can be shown that in the uncorrelated white noise case (i.e., when $$\underline{\Phi}_{zz}(k) = \frac{N_0}{T_0} I,$$

where $N_0$ is the power spectral density of the noise at the receiver and $1/T_0$ is the bandwidth, in Hertz, of a frequency bin), the channel capacity is achieved when the power spectral density matrix $\underline{\Phi}_{xx}(k)$ of the transmitted signal vector $\underline{x}(n)$ satisfies the condition:

$$\underline{\Phi}_{xx}(k) = \underline{V}(k)\underline{E}_{\lambda}(k)\underline{V}^H(k), \quad \text{Eq(3)}$$

where $\underline{E}_\lambda(k)$ is an $N_T \times N_T$ diagonal matrix containing a set of energies (or transmit powers) assigned to the eigen-modes at frequency $f_k$. The diagonal matrix $\underline{E}_\lambda(k)$ is the solution to the well-known "water-pouring" transmit energy distribution technique, which may be expressed as:

$$E_{i,\lambda}(k) = \max\left[B - \frac{N_0}{|\lambda_i(k)|^2}, 0\right], \text{ and} \quad \text{Eq (4a)}$$

$$E_T = \sum_{i=1}^{\min(N_R, N_T)} \sum_{k=1}^{N_F} E_{i,\lambda}(k), \quad \text{Eq (4b)}$$

where B is a constant derived from various system parameters.

The water-pouring technique is analogous to pouring a fixed amount of water into a vessel with an irregular bottom, where each eigen-mode of each frequency bin corresponds to a point on the bottom of the vessel, and the elevation of the bottom at any given point corresponds to the inverse of the SNR associated with that eigen-mode. A low elevation thus corresponds to a high SNR and, conversely, a high elevation corresponds to a low SNR. The total available transmit power, $E_T$, is then "poured" into the vessel such that the lower points in the vessel (i.e., higher SNRs) are filled first, and the higher points (i.e., lower SNRs) are filled later. The constant B is indicative of the water surface level for the vessel after all of the total available transmit power has been poured, and may be estimated initially based on various system parameters. The transmit power distribution is dependent on the total available transmit power and the depth of the vessel over the bottom surface, and the points with elevations above the water surface level are not filled (i.e., eigen-modes with SNRs below a particular threshold are not used).

The water-pouring technique is described by Robert G. Gallager, in "Information Theory and Reliable Communication," John Wiley and Sons, 1968, which is incorporated herein by reference. A specific algorithm for performing the basic water-pouring process for a MIMO-OFDM system is described in U.S. Pat. No. 6,956,907, entitled "Method and Apparatus for Determining Power Allocation in a MIMO Communication System," filed Oct. 15, 2001, assigned to the assignee of the present application and incorporated herein by reference.

The formulation of channel capacity shown in equations (1) through (4) suggests that an OFDM-based implementation may be used to achieve channel capacity by performing water-pouring in the frequency domain. With frequency-domain water-pouring, the total available transmit power is allocated to the $N_F$ frequency subchannels (or bins) on a bin-by-bin basis, with more power being allocated to bins achieving higher SNRs and less or no power being allocated to bins achieving lower SNRs. This would then necessitate the use of separate coding and/or modulation schemes for each bin, which can complicate the coding and decoding at the transmitter and receiver, respectively.

Aspects of the invention provide techniques for achieving high performance (i.e., channel capacity) via a time-domain implementation that uses frequency-domain singular value decomposition and water-pouring results to derive time-domain pulse-shaping and beam-steering solutions at the transmitter and receiver.

The singular value decomposition is performed at the transmitter to determine the eigen-modes of the MIMO channel and to derive a first set of steering vectors that are used to precondition the modulation symbols. The singular value decomposition is also performed at the receiver to derive a second set of steering vectors that are used to precondition the received signals such that orthogonal symbol streams are recovered at the receiver, which can simplify the receiver processing. Water-pouring analysis is used to more optimally allocate the total available transmit power for the MIMO system to the eigen-modes such that high performance is achieved. The allocated transmit power may then determine the data rate and the coding and modulation scheme to be used for each eigen-mode.

The techniques described herein provide several potential advantages. First, with time-domain eigen-mode decomposition, the maximum number of data streams with different SNRs, and thus different coding/modulation requirements, is given by $\min(N_T, N_R)$. It is also possible to make the received SNRs for the data streams essentially the same, thereby further simplifying the coding/modulation. The inventive techniques can thus greatly simplify the coding/modulation for a data transmission by avoiding the per-bin bit allocation required to approach channel capacity in OFDM systems that utilize frequency-domain water-pouring.

Second, the orthogonalization process at the receiver results in decoupled (i.e., orthogonal) received symbol streams. This then greatly reduces the complexity of the time-domain equalization required for the decoupled symbol streams. In this case, the equalization may be achieved by simple linear space-time processing followed by parallel time-domain equalization of the independent symbol streams. In contrast, other wide-band time-domain techniques typically require more complicated space-time equalization to recover the symbol streams.

Third, the time-domain signaling techniques of the invention can more easily integrate the channel/pilot structures of various CDMA standards, which are also based on time-domain signaling. Implementation of channel/pilot structures may be more complicated in OFDM systems that perform frequency-domain signaling.

Figure 2:
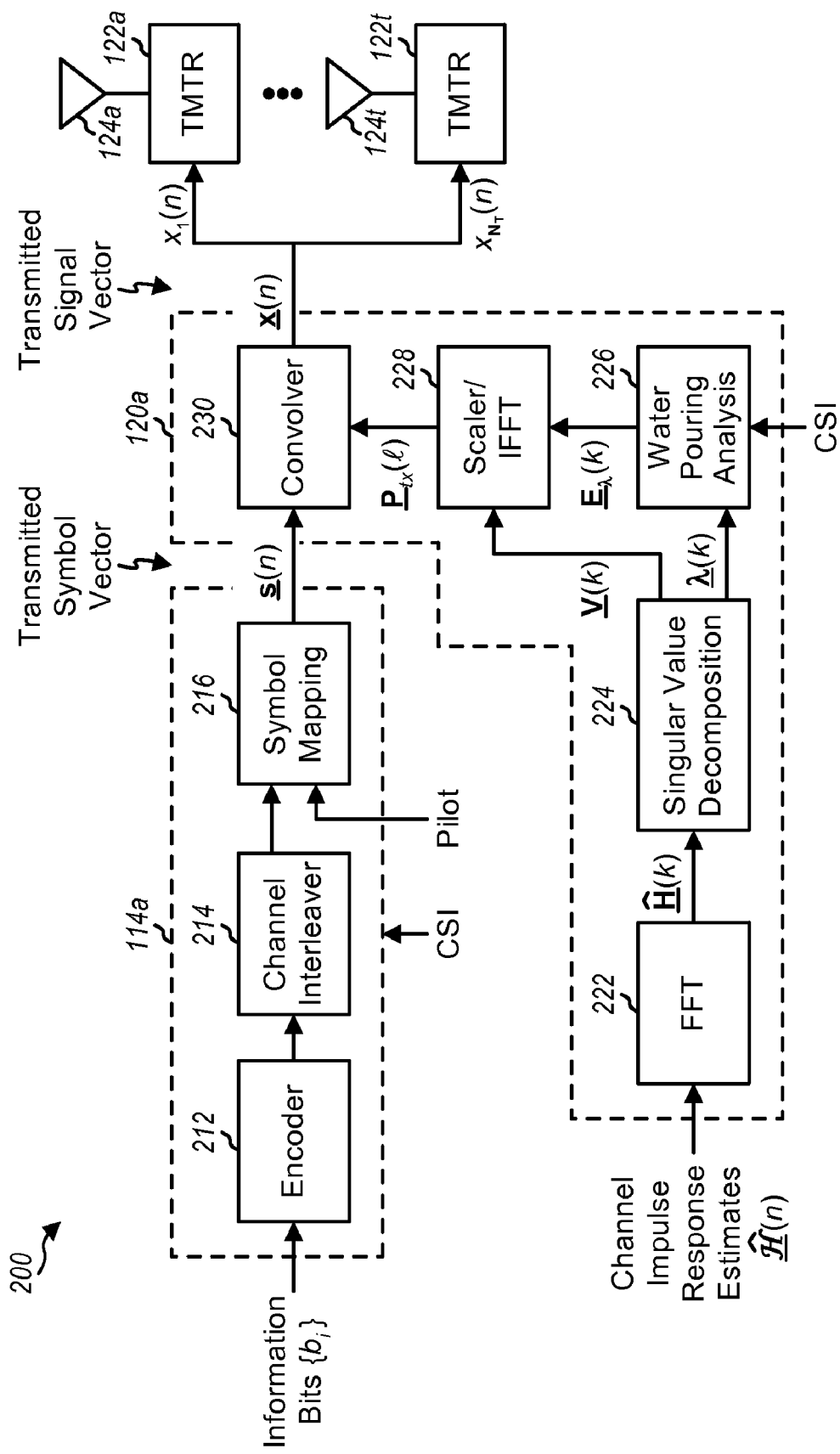
FIG. 2 is a block diagram of an embodiment of a transmitter unit capable of implementing various aspects and embodiments of the invention.

FIG. 2 is a block diagram of an embodiment of a transmitter unit 200 capable of implementing various aspects and embodiments of the invention. Transmitter unit 200 is an embodiment of the transmitter portion of transmitter system 110 in FIG. 1. Transmitter unit 200 includes (1) a TX data processor 114a that receives and processes traffic and pilot data to provide $N_T$ modulation symbol streams and (2) a TX MIMO processor 120a that preconditions the modulation symbol streams to provide $N_T$ preconditioned modulation symbol streams. TX data processor 114a and TX MIMO processor 120a are one embodiment of TX data processor 114 and TX MIMO processor 120, respectively, in FIG. 1.

In the specific embodiment shown in FIG. 2, TX data processor 114a includes an encoder 212, a channel interleaver 214, and a symbol mapping element 216. Encoder 212 receives and codes the traffic data (i.e., the information bits, $b_i$) in accordance with one or more coding schemes to provide coded bits. The coding increases the reliability of the data transmission. In an embodiment, a separate coding scheme may be used for the information bits for each spatial subchannel. In alternative embodiments, a separate coding scheme may be used for each subset of spatial subchannels, or a common coding scheme may be used for all spatial subchannels. The coding scheme(s) to be used is determined by the controls from controller 130, which may be determined based on CSI received from the receiver system. Each selected coding scheme may include any combination of cyclic redundancy check (CRC), convolutional coding, Turbo coding, block coding, and other coding, or no coding at all.

Channel interleaver 214 interleaves the coded bits based on one or more interleaving schemes (e.g., one interleaving scheme for each selected coding scheme). The interleaving provides time diversity for the coded bits, permits the data to be transmitted based on an average SNR for each spatial subchannel used for the data transmission, combats fading, and further removes correlation between coded bits used to form each modulation symbol.

Symbol mapping element 216 then receives and multiplexes pilot data with the interleaved data and further maps the multiplexed data in accordance with one or more modulation schemes to provide modulation symbols. A separate modulation scheme may be used for each spatial subchannel or for each subset of spatial subchannels. Alternatively, a common modulation scheme may be used for all spatial subchannels. The symbol mapping for each spatial subchannel may be achieved by grouping sets of bits to form non-binary symbols and mapping each non-binary symbol to a point in a signal constellation corresponding to the modulation scheme (e.g., QPSK, M-PSK, M-QAM, or some other scheme) selected for that spatial subchannel. Each mapped signal point corresponds to a modulation symbol. Symbol mapping element 216 provides a vector of modulation symbols for each symbol period, with the number of modulation symbols in each vector corresponding to the number of spatial subchannels selected for use for that symbol period. Symbol mapping element 216 thus provides up to $N_T$ modulation symbol streams (i.e., a sequence of symbol vectors with each vector including up to $N_T$ modulation symbols), which are also referred to herein as the transmitted symbol vector, s(n).

The response of the MIMO channel to be used for data transmission is estimated and used to precondition the transmitted symbol vector prior to transmission to the receiver system. In a frequency division duplex (FDD) system, the downlink and uplink are allocated different frequency bands, and the responses for the downlink and uplink may not be correlated to a sufficient degree. For the FDD system, the channel response may be estimated at the receiver and sent back to the transmitter. In a time division duplex (TDD) system, the downlink and uplink share the same frequency band in a time division multiplexed manner, and a high degree of correlation may exist between the downlink and uplink responses. For the TDD system, the transmitter system can estimate the uplink channel response (e.g., based on the pilot transmitted by the receiver system on the uplink) and derive the downlink channel response by accounting for differences between the transmit and receive antenna array manifolds.

In an embodiment, channel response estimates are provided to TX MIMO processor 120*a* as a sequence of $N_R \times N_T$ matrices of time-domain samples, $\hat{\mathcal{H}}(n)$. The $(i,j)$-th element of the estimated channel impulse response matrix $\hat{\mathcal{H}}(n)$, for $1 \leq i \leq N_R$ and $1 \leq j \leq N_T$, is a sequence of samples representing the sampled impulse response of the propagation path from the $j$-th transmit antenna to the $i$-th receive antenna.

Within TX MIMO processor 120*a*, a fast Fourier transformer 222 receives the estimated channel impulse response matrix, $\hat{\mathcal{H}}(n)$, (e.g., from the receiver system) and derives the corresponding estimated channel frequency response matrix, $\hat{H}(k)$, by performing a fast Fourier transform (FFT) on $\hat{\mathcal{H}}(n)$ (i.e., $\hat{H}(k) = \text{FFT}[\hat{\mathcal{H}}(n)]$). This may be achieved by performing an $N_F$-point FFT on a sequence of $N_F$ samples for each element of $\hat{\mathcal{H}}(n)$ to derive a sequence of $N_F$ coefficients for the corresponding element of $\hat{H}(k)$. The $N_R \cdot N_T$ elements of $\hat{H}(k)$ are thus $N_R \cdot N_T$ sequences representing the frequency responses of the propagation paths between the $N_T$ transmit antennas and $N_R$ receive antennas. Each element of $\hat{H}(k)$ is the FFT of the corresponding element of $\hat{\mathcal{H}}(n)$.

A block 224 then computes the singular value decomposition of the estimated channel frequency response matrix, $\hat{H}(k)$, for each value of $k$, where $0 \leq k \leq (N_F - 1)$ and $N_F$ is the length of the FFT (i.e., $N_F$ corresponds to the number of frequency bins). The singular value decomposition may be expressed as shown in equation (2), which is:

$$\hat{H}(k) = U(k) \lambda(k) V^H(k). \tag{Eq (2)}$$

The result of the singular value decomposition is three sequences of $N_F$ matrices, $U(k)$, $\lambda(k)$, and $V^H(k)$, for $0 \leq k \leq (N_F - 1)$. For each value of $k$, $U(k)$ is the $N_R \times N_R$ unitary matrix of left eigen-vectors of $\hat{H}(k)$, $V(k)$ is the $N_T \times N_T$ unitary matrix of right eigen-vectors of $\hat{H}(k)$, and $\lambda(k)$ is the $N_R \times N_T$ diagonal matrix of singular values of $\hat{H}(k)$.

The singular value decomposition is used to decompose the MIMO channel into its eigen-modes, at the frequency $f_k$ associated with frequency bin $k$, for each value of $k$, $0 \leq k \leq (N_F - 1)$. The rank $r(k)$ of $\hat{H}(k)$ corresponds to the number of eigen-modes for the MIMO channel at frequency $f_k$, which corresponds to the number of independent channels (i.e., the number of spatial subchannels) available in frequency bin $k$. As described in further detail below, the columns of $V(k)$ are the steering vectors associated with frequency $f_k$ to be used at the transmitter for the elements of the transmitted symbol vector, $s(n)$. Correspondingly, the columns of $U(k)$ are the steering vectors associated with frequency $f_k$ to be used at the receiver for the elements of the received signal vector, $r(n)$. The matrices $U(k)$ and $V(k)$, for $0 \leq k \leq (N_F - 1)$, are used to orthogonalize the symbol streams transmitted on the eigen-modes at each frequency $f_k$. When these matrices are used collectively to preprocess the transmitted and received symbol streams, either in the frequency domain or the time domain, as described in detail below, the result is the overall orthogonalization of the received symbol stream. This then allows for separate coding/modulation per eigen-mode (as opposed to per bin) and further simplification of the equalization of the received symbol streams at the receiver, as described below.

The elements along the diagonal of $\lambda(k)$ are $\lambda_{ii}(k)$ for $1 \leq i \leq r(k)$, where $r(k)$ is the rank of $\hat{H}(k)$. The columns of $U(k)$ and $V(k)$, $u_i(k)$ and $v_i(k)$, respectively, are solutions to the eigen equation, which may be expressed as:

$$\hat{H}(k) v_i(k) = \lambda_{ii} u_i(k). \tag{Eq (5)}$$

The $U(k)$, $\lambda(k)$, and $V(k)$ matrices may be provided in two forms—a "sorted" form and a "random-ordered" form. In the sorted form, the diagonal elements of $\lambda(k)$ are sorted in decreasing order so that $\lambda_{11}(k) \geq \lambda_{22}(k) \geq \ldots \geq \lambda_{rr}(k)$, and their eigen-vectors are arranged in corresponding order in $U(k)$ and $V(k)$. The sorted form is indicated herein by the subscript $s$, i.e., $U_s(k)$, $\lambda_s(k)$, and $V_s(k)$. In the random-ordered form, the ordering of the singular values and eigen-vectors is random and independent of frequency. The random form is indicated herein by the subscript $r$. The particular form selected for use, sorted or random-ordered, determines the eigen-modes to be used for the data transmission and the coding and modulation scheme to be used for each selected eigen-mode.

A water-pouring analysis block 226 then receives the set of singular values for each frequency bin, which is contained in the sequence of matrices, $\lambda(k)$, and CSI that includes the received SNR corresponding to each singular value. The received SNR is the SNR achieved at the receiver for the recovered modulation symbols, as described below. The matrices $\lambda(k)$ are used in conjunction with the received SNRs to derive the sequence of diagonal matrices, $E_\lambda(k)$, which are the solution to the water-pouring equations (4a) and (4b). As noted above, the diagonal matrices $E_\lambda(k)$ contain the set of energies or transmit powers assigned to the eigen-modes at each of the $N_F$ frequency bins. The water-pouring analysis used to derive the diagonal matrices, $E_\lambda(k)$, may be performed as described in the aforementioned U.S. Pat. No. 6,956,907.

A scaler/IFFT 228 receives the unitary matrices, $V(k)$, and the diagonal matrices, $E_\lambda(k)$, for all $N_F$ frequency bins, and derives a spatio-temporal pulse-shaping matrix, $P_{tx}(n)$, for the transmitter based on the received matrices. Initially, the square root of the diagonal matrices, $E_\lambda(k)$, is computed to derive a sequence of diagonal matrices, $\sqrt{E_\lambda(k)}$, whose elements are the square roots of the elements of $E_\lambda(k)$. The elements of the diagonal matrices, $E_\lambda(k)$, are representative of the transmit power allocated to the eigen-modes. The square root then transforms the power allocation to the equivalent signal scaling. The product of the square-root diagonal matrices, $\sqrt{E_\lambda(k)}$, and the unitary matrices, $V(k)$, which are the sequence of matrices of right eigen-vectors of $\hat{H}(k)$, is then computed. This product, $V\sqrt{E_\lambda(k)}$, defines the optimal spatio-spectral shaping to be applied to the transmitted symbol vector, $s(n)$.

An inverse FFT of the product $V(k) \sqrt{E_\lambda(k)}$ is then computed to derive the spatio-temporal pulse-shaping matrix, $P_{tx}(\ell)$, for the transmitter, which may be expressed as:

$$P_{tx}(\ell) = \text{IFFT}[V(k) \sqrt{E_\lambda(k)}]. \tag{Eq (6)}$$

The pulse-shaping matrix, $P_{tx}(\ell)$, is an $N_T \times N_T$ matrix. Each element of $P_{tx}(\ell)$ is a sequence of values. Each column of $P_{tx}(\ell)$ is a steering vector for a corresponding element of $s(n)$.

A convolver 230 receives and preconditions (e.g., convolves) the transmitted symbol vector, s(n), with the pulse-shaping matrix, $\underline{P}_{tx}(\ell)$, to derive the transmitted signal vector, $\underline{x}(n)$. The convolution of $\underline{s}(n)$ with $\underline{P}_{tx}(\ell)$ may be expressed as:

$$\underline{x}(n) = \sum_l \underline{P}_{tx}(l)\underline{s}(n-l). \qquad \text{Eq (7)}$$

The matrix convolution shown in equation (7) may be performed as follows. To derive the i-th element of the vector x(n) for time n, $x_i(n)$, the inner product of the i-th row of the matrix $\underline{P}_{tx}(\ell)$ with the vector s(n−$\ell$) is formed for a number of delay indices (e.g., $0 \leq \ell \leq (N_F-1)$), and the results are accumulated to derive the element $x_i(n)$. The signal transmitted on each transmit antenna (i.e., each element of x(n) or $x_i(n)$) is thus formed as a weighted combination of the $N_R$ modulation symbol streams, with the weighting determined by the appropriate column of the matrix $\underline{P}_{tx}(\ell)$. The process is repeated such that each element of the vector x(n) is derived from a respective column of the matrix $\underline{P}_{tx}(\ell)$ and the vector s(n).

Each element of the transmitted signal vector, x(n), corresponds to a sequence of preconditioned symbols to be transmitted over a respective transmit antenna. The $N_T$ preconditioned symbol sequences (i.e., a sequence of preconditioned symbol vectors with each vector including up to $N_T$ preconditioned symbols) correspond to $N_T$ transmitted signals, and are also referred to herein as the transmitted signal vector, x(n). The $N_T$ transmitted signals are provided to transmitters 122a through 122t and processed to derive $N_T$ modulated signals, which are then transmitted from antennas 124a through 124t, respectively.

The embodiment shown in FIG. 2 performs time-domain beam-steering of the transmitted symbol vector, s(n). The beam-steering may also be performed in the frequency domain. In this case, the vector s(n) may be transformed via an FFT to derive a frequency-domain vector S(k). The vector S(k) is then multiplied with the matrix $\underline{V}(k) \sqrt{\underline{E}_\lambda(k)}$ to derive a frequency-domain vector $\underline{X}(k)$, as follows:

$$\underline{X}(k) = [\underline{V}(k)\sqrt{\underline{E}_\lambda(k)}]\underline{S}(k).$$

The transmitted signal vector, x(n), may then be derived by performing an IFFT on the vector $\underline{X}(k)$ (i.e., $\underline{x}(n)$=IFFT[$\underline{X}(k)$]).

Figure 3:
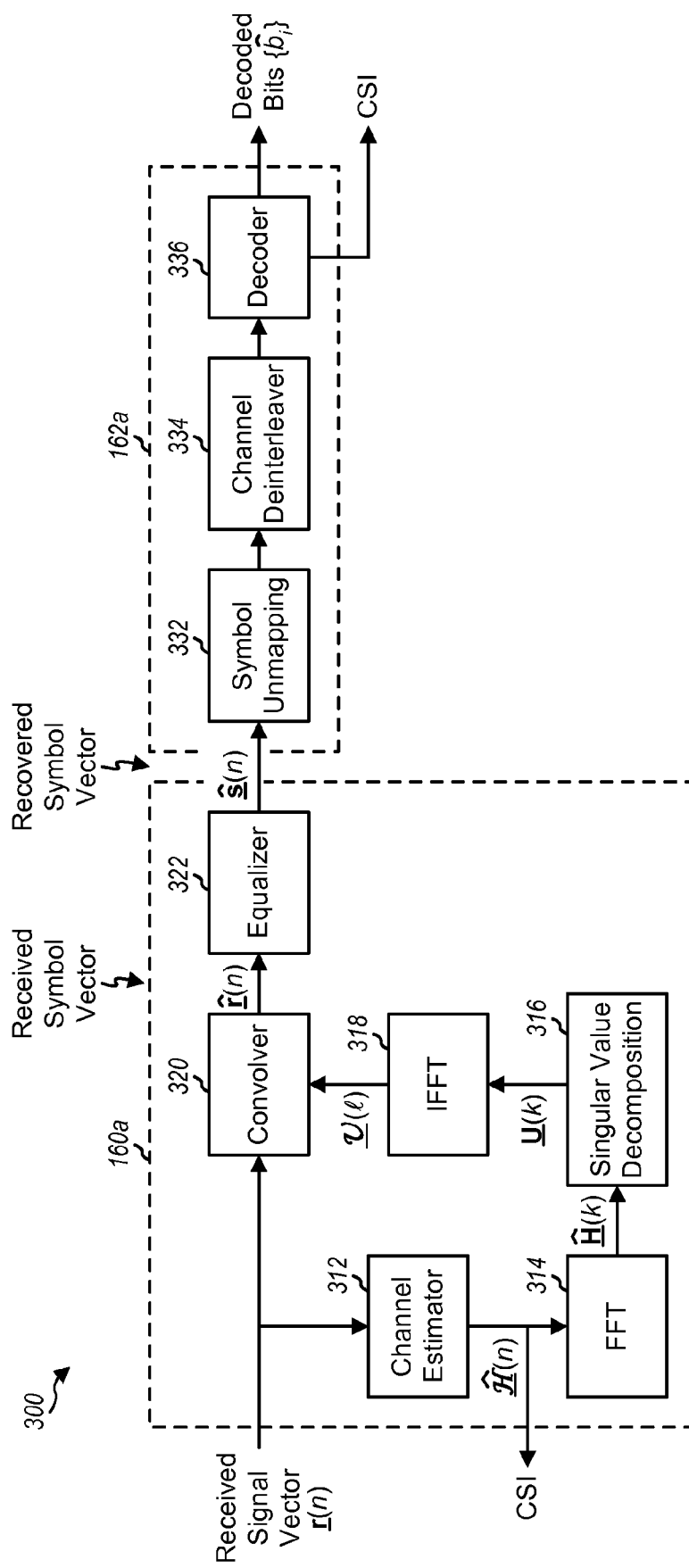
FIG. 3 is a block diagram of an embodiment of a receiver unit capable of implementing various aspects and embodiments of the invention.

FIG. 3 is a block diagram of an embodiment of a receiver unit 300 capable of implementing various aspects and embodiments of the invention. Receiver unit 300 is an embodiment of the receiver portion of receiver system 150 in FIG. 1. Receiver unit 300 includes (1) a RX MIMO processor 160a that processes $N_R$ received sample streams to provide $N_T$ recovered symbol streams and (2) a RX data processor 162a that demodulates, deinterleaves, and decodes the recovered symbols to provide decoded bits. RX MIMO processor 160a and RX data processor 162a are one embodiment of RX MIMO processor 160 and RX data processor 162, respectively, in FIG. 1.

Referring back to FIG. 1, the transmitted signals from $N_T$ transmit antennas are received by each of $N_R$ antennas 152a through 152r, and the received signal from each antenna is routed to a respective receiver 154 (which is also referred to as a front-end processor). Each receiver 154 conditions (e.g., filters and amplifies) a respective received signal, downconverts the conditioned signal to an intermediate frequency or baseband, and digitizes the downconverted signal to provide ADC samples. Each receiver 154 may further data demodulate the ADC samples with a recovered pilot to generate a respective stream of received samples. Receivers 154a through 154r thus collectively provide $N_R$ received sample streams (i.e., a sequence of vectors with each vector including up to $N_R$ samples), which are also referred to as the received signal vector, r(n). The received signal vector, r(n), is then provided to RX MIMO processor 160a.

Within RX MIMO processor 160a, a channel estimator 312 receives the vector r(n) and derives an estimated channel impulse response matrix, $\hat{\underline{\mathcal{H}}}(n)$, which may be sent back to the transmitter system and used in the transmit processing. An FFT 314 then performs an FFT on the estimated channel impulse response matrix, $\hat{\underline{\mathcal{H}}}(n)$, to derive the estimated channel frequency response matrix, $\hat{\underline{H}}(k)$.

A block 316 then computes the singular value decomposition of $\hat{\underline{H}}(k)$ for each value of k to obtain the matrix of left eigen-vectors, U(k), for the corresponding frequency bin k. Each column of U(k) is a steering vector for a corresponding element of r(n), and is used to orthogonalize the received symbol streams at the receiver system. An IFFT 318 then performs the inverse FFT of U(k) to derive a spatio-temporal pulse-shaping matrix, $\underline{V}(\ell)$, for the receiver system.

A convolver 320 then derives the received symbol vector, $\hat{r}(n)$, which is an estimate of the transmitted symbol vector, s(n), by performing a convolution of the received signal vector, r(n), with the conjugate transpose of the spatio-temporal pulse-shaping matrix, $\underline{V}^H(\ell)$. This convolution may be expressed as:

$$\hat{\underline{r}}(n) = \sum_l \underline{v}^H(l)\underline{r}(n-l). \qquad \text{Eq (8)}$$

The pulse-shaping at the receiver may also be performed in the frequency domain, similar to that described above for the transmitter. In this case, the received signal vector, r(n), may be transformed via an FFT to derive a frequency-domain vector R(k). The vector R(k) is then pre-multiplied with the conjugate transpose matrix $\underline{U}^H(k)$ to derive a frequency-domain vector $\hat{R}(k)$. The result of this matrix multiplication, $\hat{R}(k)$, can then be transformed via an inverse FFT to derive the time-domain received symbol vector, $\hat{r}(n)$. The convolution of the vector r(n) with the matrix $\underline{V}^H(\ell)$ can thus be represented in the discrete frequency domain as:

$$\hat{\underline{R}}(k) = \underline{U}^H(k)\underline{R}(k) = \hat{\underline{\lambda}}(k)\underline{S}(k) + \hat{\underline{Z}}(k), \qquad \text{Eq (9)}$$

where $\hat{\underline{\lambda}}(k) = \underline{\lambda}(k)\sqrt{\underline{E}_\lambda(k)}$ is a matrix of weighted singular values of $\hat{\underline{H}}(k)$, with the weights being the square root of the water-pouring solution, $\sqrt{\underline{E}_\lambda(k)}$;

S(k) is the FFT of s(n), the transmitted symbol vector;
R(k) is the FFT of r(n), the received signal vector;
$\hat{R}(k)$ is the FFT of $\hat{r}(n)$, the received symbol vector;
$\underline{Z}(k)$ is the FFT of z(n), the vector of received noise samples; and
$\hat{\underline{Z}}(k)$ is the FFT of the received noise process as transformed by the unitary matrix $\underline{U}^H(k)$.

From equation (9), the received symbol vector, $\hat{r}(n)$, may be characterized as a convolution in the time domain, as follows:

$$\hat{\underline{r}}(n) = \sum_l \underline{\Lambda}(l)\underline{s}(n-l) + \hat{\underline{z}}(n), \qquad \text{Eq (10)}$$

where $\underline{\Lambda}(\ell)$ is the inverse FFT of $\hat{\underline{\lambda}}(k) = \underline{\lambda}(k)\sqrt{\underline{E}_\lambda(k)}$; and $\hat{z}(n)$ is the received noise as transformed by the receiver spatio-temporal pulse-shaping matrix, $\underline{V}^H(\ell)$.

The matrix $\underline{\Lambda}(\ell)$ is a diagonal matrix of eigen-pulses, with each such eigen-pulse being derived as the IFFT of the corresponding set of singular values in $\hat{\lambda}(k)$ for $0 \leq k \leq (N_F-1)$.

The two forms for ordering the singular values, sorted and random-ordered, result in two different types of eigen-pulses. For the sorted form, the resulting eigen-pulse matrix, $\underline{\Lambda}_s(\ell)$, is a diagonal matrix of pulses that are sorted in descending order of energy content. The pulse corresponding to the first diagonal element of the eigen-pulse matrix, $\{\underline{\Lambda}_s(\ell)\}_{11}$, has the most energy, and the pulses corresponding to elements further down the diagonal have successively less energy. Furthermore, when the SNR is low enough that water-pouring results in some of the frequency bins having no energy, the energy is taken out of the smallest eigen-pulses first. Thus, at low SNRs, one or more of the eigen-pulses may have no energy. This has the advantage that at low SNRs, the coding and modulation are simplified through the reduction in the number of orthogonal subchannels. However, in order to approach channel capacity, it is necessary to code and modulate separately for each eigen-pulse.

The random-ordered form of the singular values in the frequency domain may be used to further simplify coding and modulation (i.e., to avoid the complexity of separate coding and modulation for each element of the eigen-pulse matrix). In the random-ordered form, for each frequency bin, the ordering of the singular values is random instead of being based on their size. This random ordering can result in approximately equal energy in all of the eigen-pulses. When the SNR is low enough to result in frequency bins with no energy, these bins are spread approximately evenly among the eigen-modes so that the number of eigen-pulses with non-zero energy is the same independent of SNR. At high SNRs, the random-order form has the advantage that all of the eigen-pulses have approximately equal energy, in which case separate coding and modulation for different eigen-modes is not required.

If the response of the MIMO channel is frequency selective (i.e., different values for $\underline{H}(k)$ for different values of k), the eigen-pulses in the matrix $\underline{\Lambda}(\ell)$ are time-dispersive. In this case, the resulting received symbol sequences, $\hat{r}(n)$, have inter-symbol interference (ISI) that will in general require equalization to provide high performance. Furthermore, because the singular values in $\underline{\lambda}(k)$ are real, the elements of $\hat{\lambda}(k) = \lambda(k)\sqrt{E_\lambda(k)}$ are also real, and the eigen-pulses in the matrix $\underline{\Lambda}(\ell)$ exhibit aliased conjugate symmetry properties. If steps are taken to avoid this time-domain aliasing (e.g., by using an FFT length, $N_F$, that is sufficiently greater than the number of non-zero samples in the estimated channel impulse response matrix, $\underline{\hat{\mathcal{H}}}(n)$) then the eigen-pulse matrix is conjugate symmetric in the delay variable, $\ell$, i.e., $\underline{\Lambda}(\ell) = \underline{\Lambda}^*(-\ell)$.

An equalizer 322 receives the received symbol vector, $\hat{r}(n)$, and performs space-time equalization to derive a recovered symbol vector, $\hat{s}(n)$, which is an estimate of the transmitted symbol vector, $\underline{s}(n)$. The equalization is described in further detail below. The recovered symbol vector, $\hat{s}(n)$, is then provided to RX data processor 162a.

Within RX data processor 162a, a symbol unmapping element 332 demodulates each recovered symbol in $\hat{s}(n)$ in accordance with a demodulation scheme (e.g., M-PSK, M-QAM) that is complementary to the modulation scheme used for that symbol at the transmitter system. The demodulated data from symbol unmapping element 332 is then de-interleaved by a deinterleaver 334, and the deinterleaved data is further decoded by a decoder 336 to obtain the decoded bits, $\hat{b}_i$, which are estimates of the transmitted information bits, $b_i$. The deinterleaving and decoding are performed in a manner complementary to the interleaving and encoding, respectively, performed at the transmitter system. For example, a Turbo decoder or a Viterbi decoder may be used for decoder 336 if Turbo or convolutional coding, respectively, is performed at the transmitter system.

Minimum Mean Square Error (MMSE) Equalization

As shown in equation (10), an equivalent channel for the received symbol vector, $\hat{r}(n)$, has an impulse response (i.e., a unit sample response) of $\underline{\Lambda}(\ell)$, which is the diagonal matrix of eigen-pulses, and a corresponding frequency response of $\underline{\lambda}(f)$. A matched filter receiver for $\hat{r}(n)$ would then include a filter matched to the impulse response of $\underline{\Lambda}(\ell)$. Such a matched filter would have an impulse response of $\underline{\Lambda}^H(-\ell)$ and a frequency response of $\underline{\lambda}^r(f)$, which may be expressed as:

$$\underline{\lambda}^r(f) = \sum_{l=-\infty}^{\infty} \underline{\Lambda}^H(l) e^{j2\pi fl}. \qquad \text{Eq (11)}$$

The end-to-end frequency response of the equivalent channel for $\hat{r}(n)$ and its matched filter may be given as $\underline{\psi}(f) = \underline{\lambda}(f)\underline{\lambda}^r(f)$.

The end-to-end frequency response of $\underline{\psi}(f)$ may be spectrally factorized into a hypothetical filter and its matched filter. This hypothetical filter would have a causal impulse response of $\underline{\Gamma}(\ell)$, where $\underline{\Gamma}(\ell)=0$ for $\ell \leq 0$, and a frequency response of $\underline{\gamma}(f)$. The end-to-end frequency response of the hypothetical filter and its matched filter is (by definition) equal to the end-to-end frequency response of the equivalent channel and its matched filter, i.e., $\underline{\gamma}(f)\underline{\gamma}^H(f) = \underline{\psi}(f)$.

For the following analysis, an equivalent channel model may be defined to have spectrally white noise. This may be achieved by applying a noise-whitening filter having a frequency response matrix, $(\underline{\gamma}^H(f))^+ = (\underline{\gamma}(f)\underline{\gamma}^H(f))^{-1}\underline{\gamma}(f)$, which is the Moore-Penrose inverse of $\underline{\gamma}^H(f)$, to the output of the receiver matched filter. The overall frequency response of the channel (with frequency response of $\underline{\lambda}(f)$), the matched filter (with frequency response of $\underline{\lambda}^r(f)$), and the noise-whitening filter (with frequency response of $(\underline{\gamma}^H(f))^+$) may then be expressed as:

$$\underline{\lambda}(f)\, \underline{\lambda}^r(f)(\underline{\gamma}^H(f))^+ = \underline{\psi}(f)(\underline{\gamma}^H(f))^+ = \underline{\gamma}(f). \qquad \text{Eq (12)}$$

The impulse response $\underline{\Gamma}(\ell)$ corresponding to the frequency response $\underline{\gamma}(f)$ is a diagonal matrix.

Figure 4A:
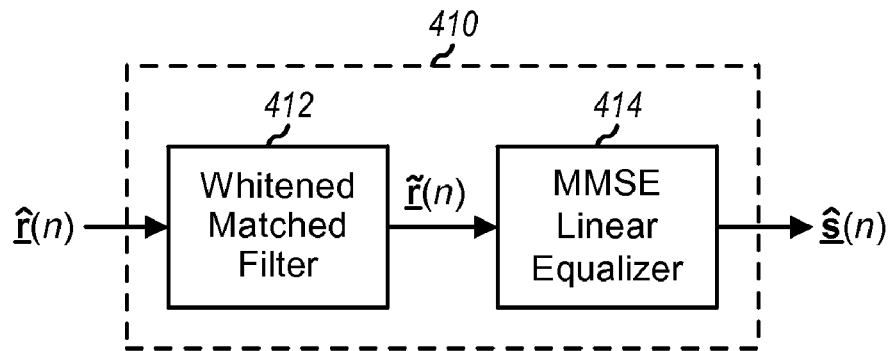
FIGS. 4A and 4B are block diagrams of an equivalent channel model and an implementation, respectively, of a minimum mean square error linear equalizer (MMSE-LE)

FIG. 4A is a diagram of a minimum mean square error linear equalizer (MMSE-LE) 414 derived based on an equivalent channel model. The received symbol vector, $\hat{r}(n)$, is filtered by a (hypothetical) whitened matched filter 412 to provide a filtered symbol vector, $\tilde{r}(n)$. Whitened matched filter 412 performs the dual function of matched filtering for $\hat{r}(n)$ and noise whitening, and has a response of $\underline{\lambda}^r(f)(\underline{\gamma}^H(f))^+$. The filtered symbol vector, $\tilde{r}(n)$, is the output of the equivalent channel model and may be expressed as:

$$\tilde{r}(n) = \sum_{l=0}^{L} \underline{\Gamma}(l)\underline{s}(n-l) + \underline{z}(n) = \underline{\Gamma}\underline{s}(n) + \tilde{\underline{z}}(n), \qquad \text{Eq (13)}$$

where $\underline{\Gamma}$ is an $N_R \times (L+1)N_T$ block-structured matrix that represents the sequence of matrices, $\underline{\Gamma}(\ell)$, for the sampled channel-whitened eigen-pulses and can be represented as:

$$\underline{\Gamma} = [\underline{\Gamma}(0)\underline{\Gamma}(1)\ldots\underline{\Gamma}(L)]$$

and s(n) is a sequence of L+1 vectors of modulation symbols and can be represented as:

$$\underline{s}(n) = \begin{bmatrix} \underline{s}(n) \\ \underline{s}(n-1) \\ \vdots \\ \underline{s}(n-L) \end{bmatrix}.$$

Each vector of s(n) comprises up to $N_T$ symbols and each symbol in the vector is associated with one of the eigen-pulses in the matrix $\underline{\Gamma}$. The blocks of $\underline{\Gamma}$ (i.e., $\underline{\Gamma}(0), \underline{\Gamma}(1), \ldots, \underline{\Gamma}(L)$) are all diagonal.

When the receiver input noise is white and has a power spectral density of $N_0 \underline{I}$, the noise vector $\hat{z}(n)$ has an autocorrelation function, $\underline{\phi}_{\hat{z}\hat{z}}(k)$, which can be expressed as:

$$\underline{\varphi}_{\hat{z}\hat{z}}(m) = E[\hat{z}(n-m)\hat{z}^H(n)] = N_0 \underline{\varphi}_{vv}(m), \quad \text{Eq (14)}$$

where $$\varphi_{UU}(m) = \sum_l \underline{v}^H(l) \underline{U}(l+m),$$

Since the sequence of matrices, V(k), of right eigen-vectors of $\hat{\underline{H}}(k)$ are all unitary, then $\underline{V}^H(k)\underline{V}(k) = \underline{I}$ for each value of k. As a result, $\underline{\phi}_{vv}(m)$, which is the inverse FFT of the sequence $\underline{V}^H(k)\underline{V}(k)$, is given by:

$$\underline{\phi}_{vv}(m) = \underline{I}\delta(m), \quad \text{Eq (15)}$$

where $\delta(m)$ is the unit sample sequence, which may be expressed as:

$$\delta(m) = \begin{cases} 1, & m=0 \\ 0, & \text{otherwise} \end{cases}.$$

The noise vector, $\tilde{z}(n)$, after the whitened matched filter has an autocorrelation function, $\underline{\phi}_{\tilde{z}\tilde{z}}(m)$, which may then be expressed as:

$$\underline{\phi}_{\tilde{z}\tilde{z}}(m) = \underline{\phi}_{\hat{z}\hat{z}}(m) = N_0 \underline{I}\delta(m). \quad \text{Eq (16)}$$

An MMSE-LE computes an initial estimate, $\tilde{\underline{s}}(n)$, of the transmitted symbol vector, $\underline{s}(n)$, at time n by performing a matrix convolution of the sequence of filtered symbol vectors, $\tilde{\underline{r}}(n)$, with a sequence of 2K+1, $N_T \times N_R$ weight matrices, $\underline{M}(\ell)$, as follows:

$$\tilde{\underline{s}}(n) = \sum_{l=-K}^{K} \underline{M}(l)\tilde{\underline{r}}(n-l) = \underline{\underline{M}}\, \underline{\tilde{r}}(n), \quad \text{Eq (17)}$$

where $\underline{\underline{M}} = [\underline{M}(-K) \ldots \underline{M}(0) \ldots \underline{M}(K)]$;

K is a parameter that determines the delay-extent of the equalizer; and $$\underline{\tilde{r}}(n) = \begin{bmatrix} \tilde{\underline{r}}(n+K) \\ \vdots \\ \tilde{\underline{r}}(n) \\ \vdots \\ \tilde{\underline{r}}(n-K) \end{bmatrix}.$$

The sequence of weight matrices, $\underline{M}(\ell)$, is selected to minimize the mean-square error, which can be expressed as:

$$\epsilon = E\{\underline{e}^H(n)\underline{e}(n)\}, \quad \text{Eq (18)}$$

where the error e(n) can be expressed as:

$$\underline{e}(n) = \underline{s}(n) - \tilde{\underline{s}}(n). \quad \text{Eq (19)}$$

The MMSE solution can then be stated as the sequence of weight matrices, $\underline{M}(\ell)$, that satisfy the following linear constraints:

$$\sum_{l=-K}^{K} \underline{M}(l)\underline{\varphi}_{\tilde{r}\tilde{r}}(l-m) = \begin{cases} 0, & -K \le m < -L \\ \underline{\Gamma}^H(-m), & -L \le m \le 0 \\ 0, & 0 < m \le K \end{cases}, \quad \text{Eq (20)}$$

where $\underline{\phi}_{\tilde{r}\tilde{r}}(m)$ is a sequence of $N_R \times N_R$ space-time correlation matrices. The matrices $\underline{\phi}_{\tilde{r}\tilde{r}}(m)$ can be expressed as:

$$\varphi_{\tilde{r}\tilde{r}}(m) = \quad \text{Eq (21)}$$

$$E[\tilde{\underline{r}}(n-m)\tilde{\underline{r}}^H(n)] = \begin{cases} \sum_{l=0}^{L} \underline{\Gamma}(l)\underline{\Gamma}(l+m) + \underline{\varphi}_{\hat{z}\hat{z}}(m), & -L \le m \le L \\ \underline{\varphi}_{\hat{z}\hat{z}}(m), & \text{otherwise} \end{cases},$$

where $\underline{\phi}_{\tilde{r}\tilde{r}}(m)$ is given by equations (14) through (16).

For spatially and temporally uncorrelated noise, $\underline{\phi}_{\hat{z}\hat{z}}(m) = N_0 \underline{I}\delta(m)$. In this case, all of the off-diagonal terms in $\underline{\phi}_{\tilde{r}\tilde{r}}(\ell-m)$ and $\underline{\Gamma}^T(-m)$ are zero, and all of the off-diagonal terms in $\underline{M}(\ell)$ are also zero, which then results in a set of decoupled equations for the equalizer coefficients. Thus, the linear constraints in equation (20) may be simplified as follows:

$$\sum_{l=-K}^{K} m_{ii}(l)(\varphi_{\tilde{r}\tilde{r}}(l-m))_{ii} = \Gamma_{ii}^*(-m), \quad \text{Eq (22)}$$

for $1 \le i \le r; -L \le m \le 0$ where r is the rank of the matrix $\hat{\underline{H}}(k)$.

Equation (20) can further be represented as:

$$\underline{\underline{M}}\underline{\Phi}_{\tilde{r}\tilde{r}} = \underline{\Gamma}^H, \text{ or } \underline{\underline{M}} = \underline{\Gamma}^H \underline{\Phi}_{\tilde{r}\tilde{r}}^{-1}, \quad \text{Eq (23)}$$

where $\underline{\phi}_{\tilde{r}\tilde{r}}$ is block-Toeplitz with block j, k given by $\underline{\phi}\underline{\phi}_{\tilde{r}\tilde{r}}(j-k)$ and $$\underline{\Gamma} = \begin{bmatrix} \underline{0}_{(K-L)N_R \times N_T} \\ \underline{\Gamma}(L) \\ \underline{\Gamma}(L-1) \\ \vdots \\ \underline{\Gamma}(0) \\ \underline{0}_{KN_R \times N_T} \end{bmatrix},$$

where $\underline{0}_{m \times n}$ is an m×n matrix of zeros.

The frequency response matrix, $\underline{m}(f)$, corresponding to the time-domain weight matrices, $\underline{M}(\ell)$, $-L \leq \ell \leq L$, for the MMSE-LE may be derived by taking the matrix Fourier transform of $\underline{M}(\ell)$, as follows:

$$\underline{m}(f) = \sum_{l=-L}^{L} \underline{M}(l) e^{-j2\pi l f}. \qquad \text{Eq (24)}$$

Since $\underline{M}(\ell)$ is diagonal, the frequency response matrix, $\underline{m}(f)$, is also diagonal.

As shown in FIG. 4A, the filtered symbol vector, $\tilde{r}(n)$, is provided to an MMSE-LE 414 and equalized based on the frequency response matrix, $\underline{m}(f)$, to derive the symbol vector, $\tilde{s}(n)$, which is the estimate of the transmitted symbol vector, $s(n)$. Because of the pulse-shaping performed at both the transmitter and receiver systems, the received symbol sequences in $\tilde{r}(n)$ are orthogonal and the weight matrices, $\underline{M}(\ell)$, for the MMSE-LE are diagonal matrices. Thus, each of the $N_R$ received symbol sequences in $\tilde{r}(n)$ may be equalized independently by the MMSE-LE, which can greatly simplify the receiver processing.

To determine the SNR associated with the symbol estimates, $\tilde{s}(n)$, an unbiased minimum mean square error estimate is first derived. For the initial symbol estimate, $\tilde{s}(n)$, derived above, $$\begin{aligned} E[\tilde{s}(n) \mid s(n)] &= \underline{M} E[\tilde{r}(n) \mid s(n)] \\ &= [\underline{M}(-K)\underline{\Gamma} s(n+K) + \ldots + \underline{M}(0)\underline{\Gamma} s(n) + \ldots + \\ &\quad \underline{M}(K)\underline{\Gamma} s(n-K)], \end{aligned} \qquad \text{Eq (25)}$$

where the expectation is taken over the noise. If it is assumed that the modulation symbols are uncorrelated in time and the expectation is taken over all inter-symbol interference in the above (all transmitted signal components not transmitted at time n), then the expectation can be expressed as:

$$\begin{aligned} E[\tilde{s}(n) \mid s(n)] &= \underline{M} E[\tilde{r}(n) \mid s(n)] \\ &= [\underline{M}(0)\underline{\Gamma}(0) + \underline{M}(-1)\underline{\Gamma}(1) + \ldots + \\ &\quad \underline{M}(-L)\underline{\Gamma}(L)] s(n) \\ &= \underline{M}\underline{\Gamma} s(n) \\ &= \underline{G} s(n), \end{aligned} \qquad \text{Eq (26)}$$

where $$\underline{G} = \underline{M}\underline{\Gamma} = \underline{\Gamma}^H \underline{\phi}_{\tilde{r}\tilde{r}}^{-1} \underline{\Gamma}.$$

When the noise is spatially and temporally uncorrelated, $\underline{M}(\ell)$, for $-K \leq \ell \leq K$, are diagonal, so $\underline{G}$ is $N_T \times N_T$ diagonal.

After averaging over the interference from other spatial subchannels, the average value of the signal from the i-th transmit antenna at time n can be expressed as:

$$E[\tilde{s}_i(n) \mid s_i(n)] = g_{ii} s_i(n), \qquad \text{Eq (27)}$$

where $g_{ii}$ is the i-th diagonal element of G ($g_{ii}$ is a scalar), and $\tilde{s}_i(n)$ is the i-th element of the initial symbol estimate, $\tilde{s}(n)$.

By defining $$\underline{D}_G^{-1} = \text{diag}(1/g_{11}, 1/g_{22}, \ldots, 1/g_{N_T N_T}), \qquad \text{Eq (28)}$$

the unbiased symbol estimate, $\hat{s}(n)$, of the transmitted symbol vector, $s(n)$, at time n may then be expressed as:

$$\hat{s}(n) = \underline{D}_G^{-1} \tilde{s}(n) = \underline{D}_G^{-1} \underline{M} \tilde{r}(n). \qquad \text{Eq (29)}$$

The error covariance matrix associated with the unbiased symbol estimate, $\hat{s}(n)$, can be expressed as:

$$\begin{aligned} \underline{\varphi}_{ee} &= \underline{W} \\ &= E\left\{ \left[ s(n) - \underline{D}_G^{-1} \underline{M} \tilde{r}(n) \right] \left[ s^H(n) - \tilde{r}^H(n) \underline{M}^H \underline{D}_G^{-1} \right] \right\} \\ &= I - \underline{D}_G^{-1} \underline{G} - \underline{G} \underline{D}_G^{-1} + \underline{D}_G^{-1} \underline{G} \underline{D}_G^{-1}. \end{aligned} \qquad \text{Eq (30)}$$

For the spatially and temporally uncorrelated noise case, $\underline{D}_G^{-1} = \underline{G}^{-1}$, so in this case $W = G^{-1} - I$.

The SNR associated with the unbiased estimate, $\hat{s}_i(n)$, of the symbol transmitted on the i-th transmit antenna can finally be expressed as:

$$SNR_i = \frac{1}{w_{ii}} = \frac{g_{ii}}{1 - g_{ii}}. \qquad \text{Eq (31)}$$

In FIG. 4A, whitened matched filter 412 in the equivalent channel model is provided to simplify the derivation of the MMSE-LE. In a practical implementation, the response of the whitened matched filter is (automatically) incorporated within the response of the MMSE-LE when the MMSE-LE is adapted to minimize the mean square error.

Figure 4B:
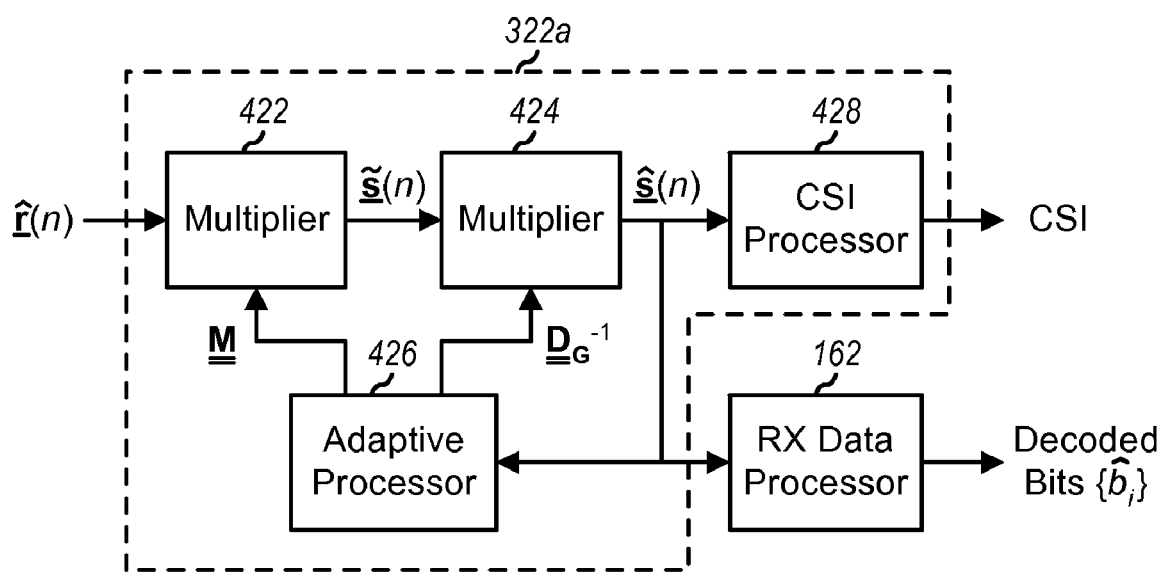

FIG. 4B is a block diagram of an embodiment of an MMSE-LE 322a, which is an embodiment of equalizer 322 in FIG. 3. Initially, the matrices H and $\underline{\phi}_{\tilde{z}\tilde{z}}$ may first be estimated based on the received pilot and/or data transmissions. The weight matrices $\underline{M}$ are then computed according to equation (23).

Within MMSE-LE 322a, the received symbol vector, $\hat{r}(n)$, from RX MIMO processor 160 are pre-multiplied by a multiplier 422 with the weight matrices $\underline{M}$ to form an initial estimate, $\tilde{s}(n)$, of the transmitted symbol vector, $s(n)$, as shown above in equation (17). The initial estimate, $\tilde{s}(n)$, is further pre-multiplied by a multiplier 424 with the diagonal matrix $\underline{D}_G^{-1}$ to form an unbiased estimate, $\hat{s}(n)$, of the transmitted symbol vector, $s(n)$, as shown above in equation (29). The unbiased estimate, $\hat{s}(n)$, comprises the recovered symbol vector that is provided by the MMSE-LE to RX data processor 162.

The recovered symbol vector, $\hat{s}(n)$, is also provided to a CSI processor 428, which derives CSI for the MIMO channel. For example, CSI processor 428 may estimate the SNR of the i-th recovered symbol sequence according to equation (31). The SNRs for the recovered symbol sequences comprise a part of the CSI that is reported back to the transmitter unit.

The recovered symbol vector, $\hat{s}(n)$, are further provided to an adaptive processor 426, which then derives the weight matrices M and the diagonal matrix $\underline{D}_G^{-1}$ based on equation (23) and (28), respectively.

Decision Feedback Equalization

A decision feedback equalizer (DFE) used in conjunction with the wideband eigen-mode transmission forms an initial estimate, $\hat{s}(n)$, of the transmitted symbol vector, $s(n)$, at time n, which can be expressed as:

$$\hat{s}(n) = \sum_{l=-K_1}^{0} \underline{M}_f(l)\tilde{r}(n-l) + \sum_{l=1}^{K_2} \underline{M}_b(l)\breve{s}(n-l), \quad \text{Eq (32)}$$

where $\tilde{r}(n)$ is the vector of filtered modulation symbols given by equation (13);
  $\breve{s}(n)$ is a vector of remodulated symbols (i.e., symbols that have been demodulated and then modulated again);
  $\underline{M}_f(\ell)$, $-K_1 \leq \ell \leq 0$, is a sequence of $(K_1+1)$-$N_T \times N_R$ feed-forward coefficient matrices; and
  $\underline{M}_b(\ell)$, $1 \leq l \leq K_2$, is a sequence of $K_2$-$N_T \times N_R$ feed-back coefficient matrices.

Equation (32) can also be expressed as:

$$\hat{s}(n) = \underline{M}_f \underline{\tilde{r}}(n) + \underline{M}_b \underline{\breve{s}}(n), \quad \text{Eq (33)}$$

where $\underline{M}_f = [\underline{M}_f(-K_1) \underline{M}_f(-K_1+1) \ldots \underline{M}_f(0)]$;

$\underline{M}_b = [\underline{M}_b(1) \underline{M}_b(2) \ldots \underline{M}_b(K_2)]$;

$$\underline{\breve{s}}(n) = \begin{bmatrix} \breve{s}(n-1) \\ \breve{s}(n-2) \\ \vdots \\ \breve{s}(n-K_2) \end{bmatrix}; \text{ and } \underline{\tilde{r}}(n) = \begin{bmatrix} \tilde{r}(n+K_1) \\ \tilde{r}(n+K_1-1) \\ \vdots \\ \tilde{r}(n) \end{bmatrix}.$$

If the MMSE criterion is used to determine the feed-forward and feed-back coefficient matrices, then the solutions for $\underline{M}_f$ and $\underline{M}_b$ that minimize the mean square error, $$\epsilon = E\{\underline{e}^H(n)\underline{e}(n)\},$$

can be used, where the error $\underline{e}(n)$ is expressed as:

$$\underline{e}(n) = \hat{s}(n) - \underline{s}(n) \quad \text{Eq (34)}$$

The MMSE solution for the feed-forward filter, $\underline{M}_f(\ell)$, for $-K_1 \leq \ell \leq 0$, is determined by the following linear constraints:

$$\sum_{l=-K_1}^{0} \underline{M}_f(l) \left[ \sum_{i=0}^{-l} \underline{\Gamma}(i)\underline{\Gamma}^H(i+l-m) + N_0 \underline{I}\delta(l-m) \right] = \underline{\Gamma}^H(-m), \quad \text{Eq (35)}$$

and can also be expressed as:

$$\underline{M}_f = \underline{\hat{\Gamma}}^H \underline{\tilde{\varphi}}_{\tilde{r}\tilde{r}}^{-1}, \quad \text{Eq (36)}$$

where $$\underline{\hat{\Gamma}} = \begin{bmatrix} \underline{0}_{(K_1-L)N_R \times N_T} \\ \underline{\Gamma}(L) \\ \underline{\Gamma}(L-1) \\ \vdots \\ \underline{\Gamma}(0) \end{bmatrix},$$

and $\underline{\tilde{\varphi}}_{\tilde{r}\tilde{r}}$ is a $(K_1+1)N_R \times (K_1+1)N_R$ matrix made up of $N_R \times N_R$ blocks. The (i, j)-th block in $\underline{\tilde{\varphi}}_{\tilde{r}\tilde{r}}$ is given by:

$$\underline{\tilde{\varphi}}_{\tilde{r}\tilde{r}}(i,j) = \sum_{l=0}^{K_1-i+1} \underline{\Gamma}(l)\underline{\Gamma}^H(l+i-j) + N_0 \underline{I}\delta(i-j). \quad \text{Eq (37)}$$

The MMSE solution for the feed-back filter may be expressed as:

$$\underline{M}_b(l) = -\sum_{i=-K_1}^{0} \underline{M}_f(i)\underline{\Gamma}(l-i), \text{ for } 1 \leq l \leq K_2 \quad \text{Eq (38)}$$

$$= -\underline{M}_f \underline{\hat{\Gamma}},$$

where $\underline{\hat{\Gamma}} = [\underline{\hat{\Gamma}}_1 \underline{\hat{\Gamma}}_2 \ldots \underline{\hat{\Gamma}}_L \underline{0}_{(K_1+1)N_R \times (K_2-L)N_T}]$, and $\underline{\hat{\Gamma}}_i = \begin{bmatrix} \underline{0}_{(K_1-L+l)N_R \times N_T} \\ \underline{\Gamma}(L) \\ \vdots \\ \underline{\Gamma}(l) \end{bmatrix}.$ Since the matrices $\underline{\Gamma}(\ell)$, for $0 \leq \ell \leq L$, are diagonal, then from equation (36), the feed-forward filter coefficient matrices, $\underline{M}_f(\ell)$, for $-K_1 \leq \ell \leq 0$, are also diagonal. It then follows that the feed-back filter coefficient matrices, $\underline{M}_b(\ell)$, for $1 \leq \ell \leq K_2$, are also diagonal.

The feed-forward filter and feed-back filter have frequency response matrices $\underline{m}_f(f)$ and $\underline{m}_b(f)$, respectively, which are given by:

$$\underline{m}_f(f) = \sum_{l=-K_1}^{0} \underline{M}_f(l) e^{-j2\pi lf}, \text{ and} \quad \text{Eq (39)}$$

$$\underline{m}_b(f) = \sum_{l=1}^{K_2} \underline{M}_b(l) e^{-j2\pi lf}.$$

Figure 5A:
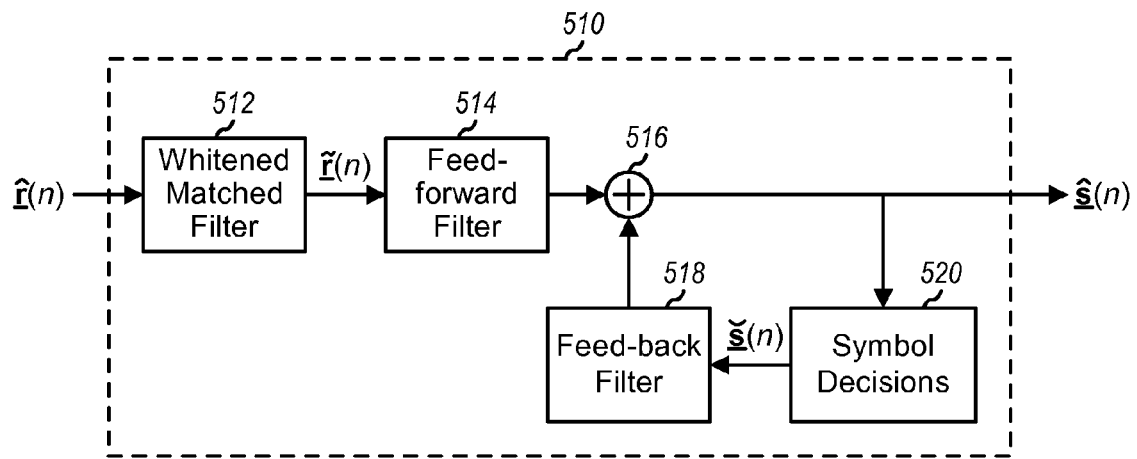
FIGS. 5A and 5B are block diagrams of an equivalent channel model and an implementation, respectively, of a decision feedback equalizer (DFE).

FIG. 5A is a diagram of a decision feedback equalizer derived based on an equivalent channel model. The received symbol vector, $\hat{r}(n)$, is filtered by a (hypothetical) whitened matched filter 512 to provide the filtered symbol vector, $\tilde{r}(n)$. The vector $\tilde{r}(n)$ is further filtered by a feed-forward filter 514 having the frequency response of $\underline{m}_f(f)$. The output from feed-forward filter 514 is summed with the output from a feed-back filter 518 by a summer 516 to derive the symbol vector $\hat{s}(n)$. This vector $s(n)$ is also provided to a symbol decision element 520 to derive the remodulated symbol vector, $\breve{s}(n)$, which represents the detected symbols for the symbol estimate $\hat{s}(n)$. The remodulated symbol vector may be derived by (1) demodulating the symbol vector $\hat{s}(n)$, possibly decoding and re-coding the demodulated data, and remodulating the demodulated data or re-coded data based on the signal constellations corresponding to the selected modulation schemes. The remodulated symbol vector, $\breve{s}(n)$, is then filtered by feed-back filter 518 with the frequency response of $\underline{m}_b(f)$, and the output of filter 518 is provided to summer 516.

Substituting equation (38) into equation (32) and assuming perfect decisions (i.e., $\breve{s}(n) = s(n)$), the initial symbol estimate, $\hat{s}(n)$, may be expressed as:

$$\hat{s}(n) = \underline{M}_f \underline{\hat{\Gamma}} s(n) + \underline{M}_f \underline{\tilde{z}}(n), \quad \text{Eq (40)}$$

where $\underline{\tilde{z}}(n) = [\underline{\tilde{z}}^T(n+K_1) \underline{\tilde{z}}^T(n+K_1-1) \ldots \underline{\tilde{z}}^T(n)]^T.$ To determine the SNR associated with the initial symbol estimate, $\tilde{s}(n)$, from the decision feedback equalizer, an unbiased minimum mean square error estimate is initially derived (similar to the MMSE-LE described above) by finding the conditional mean value of the transmitted symbol vector:

$$E[\tilde{s}(n)|s(n)] = \underline{M}_f \underline{\tilde{\Gamma}} \tilde{s}(n) = \underline{G}_{dfe} s(n), \quad \text{Eq (41)}$$

where $\underline{G}_{dfe} = \underline{M}_f \underline{\tilde{\Gamma}} = \underline{\tilde{\Gamma}}^H \underline{\phi}_{\tilde{r}\tilde{r}}^{-1} \underline{\tilde{\Gamma}}$. Next, the mean value of the i-th element of $\hat{s}(n)$, $\hat{s}_i(n)$, is expressed as:

$$E[\tilde{s}_i(n)|s_i(n)] = g_{dfe,ii} s_i(n)$$

where $g_{dfe,ii}$ is the i-th diagonal element of $\underline{G}_{dfe}$.

To form the unbiased symbol estimate, $\hat{s}(n)$, similar to that described above for the MMSE-LE, a diagonal matrix whose elements are the inverse of the diagonal elements of $\underline{G}_{dfe}$ is first defined as:

$$\underline{D}_{Gdfe}^{-1} = \text{diag}(1/g_{dfe,11}, 1/g_{dfe,22}, \ldots 1/g_{dfe,N_TN_T}) \quad \text{Eq (42)}$$

The unbiased estimate, $\hat{s}(n)$, can then be expressed as:

$$\hat{s}(n) = \underline{D}_{Gdfe}^{-1} \tilde{s}(n) \quad \text{Eq (43)}$$

$$= \underline{D}_{Gdfe}^{-1} (\underline{M}_f \tilde{r}(n) + \underline{M}_b \tilde{s}(n))$$

$$= \underline{D}_{Gdfe}^{-1} \underline{M}_f (\underline{\tilde{\Gamma}} s(n) + \tilde{z}(n)).$$

The resulting error covariance matrix is given by:

$$\underline{\varphi}_{ee} = \underline{W}_{dfe} \quad \text{Eq (44)}$$

$$= E\{[s(n) - \underline{D}_{Gdfe}^{-1} \tilde{s}(n)][s^H(n) - \tilde{s}^H(n) \underline{D}_{Gdfe}^{-1}]\}$$

$$= \underline{I} - \underline{D}_{Gdfe}^{-1} \underline{G}_{dfe} - \underline{G}_{Gdfe}^{-1} \underline{D}_{Gdfe}^{-1} + \underline{D}_{Gdfe}^{-1} \underline{G}_{dfe} \underline{D}_{Gdfe}^{-1}.$$

The SNR associated with the unbiased estimate, $\hat{s}_i(n)$, of the symbol transmitted on the i-th transmit antenna can then be expressed as:

$$SNR_i = \frac{1}{w_{dfe,ii}} = \frac{g_{dfe,ii}}{1 - g_{dfe,ii}}. \quad \text{Eq (45)}$$

Figure 5B:
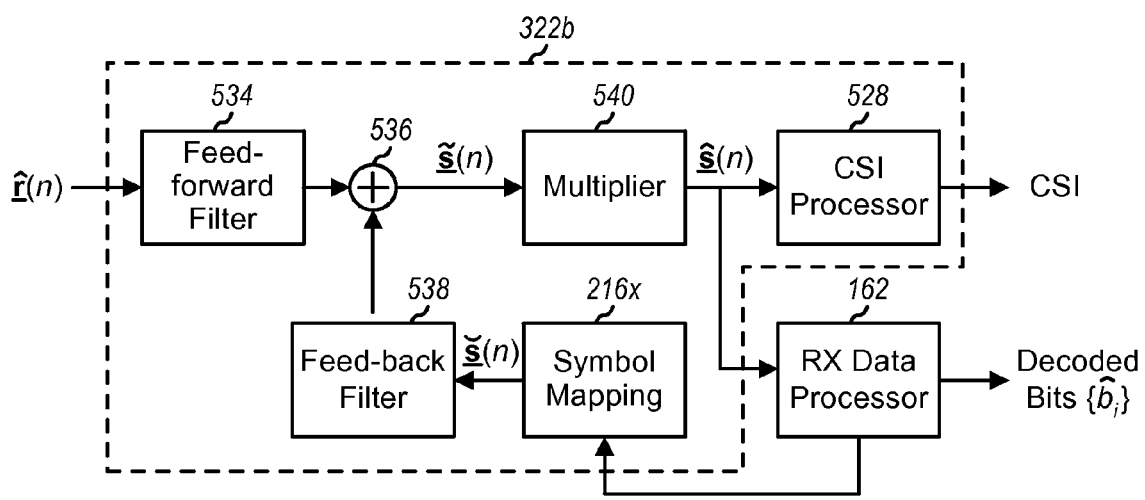

FIG. 5B is a block diagram of an embodiment of a decision feedback equalizer 322b, which is another embodiment of equalizer 322 in FIG. 3. Within decision feedback equalizer 322b, the received symbol vector, $\hat{r}(n)$, from RX MIMO processor 160 is filtered by a feed-forward filter 534, which may implement the MMSE technique described above or some other linear spatial equalization technique. A summer 536 then combines the output from feed-forward filter 534 with the estimated distortion components from a feed-back filter 538 to provide the biased symbol estimate, $\tilde{s}(n)$, having the distortion component approximately removed. Initially, the estimated distortion components are zero and the symbol estimate, $\tilde{s}(n)$, is simply the output from filter 534. The initial estimate, $\tilde{s}(n)$, for summer 536 is then multiplied with the matrix $\underline{D}_{Gdfe}^{-1}$ by a multiplier 540 to provide the unbiased estimate, $\hat{s}(n)$, of the transmitted symbol vector, $s(n)$. The unbiased estimate, $\hat{s}(n)$, comprises the recovered symbol vector that is provided to RX data processor 162.

Within RX data processor 162, symbol unmapping element 332 (in FIG. 3) provides demodulated data for the recovered symbol vector, $\hat{s}(n)$. The demodulated data is then provided to a symbol mapping element 216x within DFE 322b and modulated to provide the remodulated symbol vector, $\check{s}(n)$. Alternatively, the demodulated may be decoded, re-coded, and then provided to symbol mapping element 216x. The remodulated symbols are estimates of the modulation symbols, s(n), transmitted from the transmitter. The remodulated symbol vector, $\check{s}(n)$, is provided to feed-back filter 538, which filters the symbol vector to derive the estimated distortion components. Feed-back filter 538 may implement a linear spatial equalizer (e.g., a linear transversal equalizer).

For the DFE technique, the remodulated symbols are used to derive an estimate of the distortion generated by the already detected symbols. If the remodulated symbols are derived without errors (or with minimal errors), then the distortion component may be accurately estimated and the inter-symbol interference contributed by the already detected symbols may be effectively canceled out. The processing performed by feed-forward filter 534 and feed-back filter 538 is typically adjusted simultaneously to minimize the mean square error (MSE) of the inter-symbol interference in the recovered symbols.

The DFE and MMSE techniques are described in further detail by S.L. Ariyavistakul et al. in a paper entitled "Optimum Space-Time Processors with Dispersive Interference Unified Analysis and Required Filter Span," IEEE Trans. on Communication, Vol. 7, No. 7, July 1999, and incorporated herein by reference.

Maximum Likelihood Sequence Estimation

Maximum likelihood sequence estimation (MLSE) for channels with inter-symbol interference (ISI) is performed by forming a set of path metrics for use in the Viterbi algorithm, which searches for the most likely transmitted sequence, given the observed received signal. The MLSE is described in further detail by Andrew J. Viterbi and Jim K. Omura in "Principles of Digital Communication and Coding," McGraw-Hill, 1979, which is incorporated herein by reference.

The use of MLSE on wideband MIMO channels that have not been orthogonalized through eigenmode decomposition, however, is impractical due to the excessively high dimensionality of the channel state space. A Viterbi equalizer performing maximum likelihood sequence estimation for a MIMO channel has $M^{rL}$ states, where M is the size of the symbol alphabet, $r \leq N_T$ is the number of independent transmitted data streams, and L is the channel memory. For example, in the simple case where QPSK signaling is used (M=4) with four independent data streams (r=4) and the channel has memory of one symbol (L=1), the Viterbi equalizer would have $2^8$ states (i.e., $4^{4 \cdot 1} = 2^8$).

Using time-domain eigenmode decomposition in conjunction with Viterbi MLSE greatly reduces the state space of the Viterbi equalizer. In this case, the received symbol streams can be equalized independently, so the size of the state space is now linear in the number of independent data streams r, i.e., $rM^L$. For the previous example, the state space would be reduced to $2^4$ (i.e., $4 \cdot 4^1 = 2^4$).

The objective of the MLSE approach is to choose the transmitted sequence of symbol vectors, $\underline{s}_m(n)$, that maximizes the metric:

$$K_m = \sum_n \{2\,\text{Re}[\tilde{r}^H(n)\underline{\tilde{\Gamma}}\underline{s}_m(n)] - \underline{s}_m^H(n)\underline{\tilde{\Gamma}}^H\underline{\tilde{\Gamma}}\underline{s}_m(n)\}. \quad \text{Eq (46)}$$

Since the blocks $\Gamma(\ell)$ that make up $\Gamma$ are diagonal, $K_m$ can be expressed as the sum of r metrics, each associated with one of the MIMO channel's time-domain eigen-modes:

$$K_m = \sum_{i=1}^{r} \kappa_m(i), \qquad \text{Eq (47)}$$

where $$\kappa_m(i) = \sum_n \mu_m^i(n), \qquad \text{Eq (48)}$$

and $$\mu_m^i(n) = 2\operatorname{Re}\left[\tilde{r}_i(n)\sum_{l=0}^{L} s_{m,i}^*(n-l)\Gamma_{ii}^*(l)\right] - \sum_{l=0}^{L}\sum_{j=0}^{L} s_{m,i}^*(n-l)s_{m,i}(n-j)\Gamma^*(l)\Gamma(j). \qquad \text{Eq (49)}$$

The sequence metrics, $\kappa_m(i)$, are identical in form to sequence metrics associated with the MLSE for SISO channels with inter-symbol interference. Therefore, MLSE Viterbi equalization as is known in the art can be applied to the equalization of the individual received symbol streams, as follows.

The path metric for received symbol stream i at stage n in the Viterbi algorithm is given by $$M_i(n) = \mu_m^i(n) + M_i(n-1) \qquad \text{Eq (50)}$$

When sample n is received, (1) M values of $\mu_m^i(n)$ associated with each possible transmitted symbol, $s_{m,i}(n)$, are computed for each of the $M^L$ states associated with symbol steam i at sample time n−1, and (2) M values of $M_i(n)$, one associated with each possible value of $S_{m,i}(n)$, are computed for each state. The largest value of $M_i(n)$ is then selected for each state at sample time n, and the sequence associated with this largest value is selected as the surviving sequence at that state.

Sequence decisions may be declared when path merge events occur, which is when all of the surviving sequences merge at a common previous state. Alternatively, sequence decisions may be declared when path truncation occur at a fixed delay, which may be used to force a choice when merge events have not yet occurred.

Several different types of equalizer have been described above, including the MMSE-LE, DFE, and MLSE. Each of these equalizers may be used to equalize the received symbols to provide the recovered symbols, which are estimates of the transmitted symbols. Other types of equalizer may also be used, and this is within the scope of the invention. By orthogonalizing the received symbol streams via eigenmode decomposition, the received symbol streams may be equalized independently, which can (1) greatly reduce the complexity of the equalizer selected for use and/or (2) allow for use of other types of equalizer that may be impractical otherwise.

The techniques to transmit and receive data described herein may be implemented in various wireless communication systems, including but not limited to MIMO and CDMA systems. These techniques may also be used for the forward link and/or the reverse link.

The techniques described herein to process a data transmission at the transmitter and receiver may be implemented by various means. For example, these techniques may be implemented in hardware, software, or a combination thereof. For a hardware implementation, the elements used to perform various signal processing steps at the transmitter (e.g., to code and modulate the data, to derive the transmitter pulse-shaping matrices, to precondition the modulation symbols, and so on) or at the receiver (e.g., to derive the receiver pulse-shaping matrices, to precondition the received samples, to equalize the received symbols, to demodulate and decode the recovered symbols, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, some or all of the signal processing steps at each of the transmitter and receiver may be implemented with modules (e.g., procedures, functions, and so on) that perform the functions described herein. The software codes may be stored in a memory unit (e.g., memories 132 and 172 in FIG. 1) and executed by a processor (e.g., controllers 130 and 170). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting data in a multiple-input multiple-output (MIMO) communication system comprising:

deriving a pulse-shaping matrix based in part on a first sequence of matrices of eigenvectors and a second sequence of matrices of singular values corresponding to an estimated channel response matrix of a MIMO channel, wherein the deriving the pulse-shaping matrix comprises determining the estimated channel response matrix for the MIMO channel and decomposing the estimated channel response matrix to obtain the first sequence of matrices of eigenvectors and the second sequence of matrices of singular values;

preconditioning a plurality of modulation symbol streams based on the pulse-shaping matrix to derive a plurality of preconditioned signals; and transmitting the plurality of preconditioned signals over the MIMO channel, wherein the estimated channel response matrix comprises a plurality of eigenmodes, and wherein eigenmodes associated with singular values below a particular threshold are not selected for use for data transmission.

2. A transmitter unit in a multiple-input multiple-output (MIMO) communication system, comprising:

a TX MIMO processor operative to derive a pulse-shaping matrix based in part on a first sequence of matrices of eigenvectors and a second sequence of matrices of singular values corresponding to an estimated channel response matrix of a MIMO channel, and to precondition a plurality of modulation symbol streams based on the pulse-shaping matrix to provide a plurality of preconditioned signals, wherein the TX MIMO processor is further operative to determine the estimated channel response matrix for the MIMO channel, and decompose the estimated channel response matrix to obtain the first sequence of matrices of eigenvectors and the second sequence of matrices of singular values;

one or more transmitters operative to condition and transmit the plurality of preconditioned signals over the MIMO channel, wherein the estimated channel response matrix comprises a plurality of eigenmodes, and wherein eigenmodes associated with singular values below a particular threshold are not selected for use for data transmission.

3. A transmitter apparatus in a multiple-input multiple-output (MIMO) communication system, comprising:

means for deriving a pulse-shaping matrix based in part on a first sequence of matrices of eigenvectors and a second sequence of matrices of singular values corresponding to an estimated channel response matrix of a MIMO channel, wherein the means for deriving the pulse-shaping matrix comprises means for determining the estimated channel response matrix for the MIMO channel and means for decomposing the estimated channel response matrix to obtain the first sequence of matrices of eigenvectors and the second sequence of matrices of singular values;

means for preconditioning a plurality of modulation symbol streams based on the pulse-shaping matrix to derive a plurality of preconditioned signals; and means for transmitting the plurality of preconditioned signals over the MIMO channel, wherein the estimated channel response matrix comprises a plurality of eigenmodes, and wherein eigenmodes associated with singular values below a particular threshold are not selected for use for data transmission.

4. A memory unit for transmitting data in a multiple-input multiple-output (MIMO) communication system, the memory unit comprising software codes stored thereon, the software codes being executable by one or more processors and the software codes comprising:

codes for deriving a pulse-shaping matrix based in part on a first sequence of matrices of eigenvectors and a second sequence of matrices of singular values corresponding to an estimated channel response matrix of a MIMO channel, wherein the codes for deriving the pulse-shaping matrix comprise codes for determining the estimated channel response matrix for the MIMO channel and codes for decomposing the estimated channel response matrix to obtain the first sequence of matrices of eigenvectors and the second sequence of matrices of singular values;

codes for preconditioning a plurality of modulation symbol streams based on the pulse-shaping matrix to derive a plurality of preconditioned signals; and codes for transmitting the plurality of preconditioned signals over the MIMO channel, wherein the estimated channel response matrix comprises a plurality of eigenmodes, and wherein eigenmodes associated with singular values below a particular threshold are not selected for use for data transmission.

\* \* \* \* \*